United States Patent [19]

Baaso

[11] 4,077,534

[45] Mar. 7, 1978

[54] SELF LOAD/UNLOAD TRAILER

[76] Inventor: George L. Baaso, 31418 Schoenherr, Apt. 4, Warren, Mich. 48093

[21] Appl. No.: 772,386

[22] Filed: Feb. 28, 1977

[51] Int. Cl.² .............................................. B60P 1/54
[52] U.S. Cl. .................................................. 214/396
[58] Field of Search ...................... 214/394, 396, 75 H

[56] References Cited
U.S. PATENT DOCUMENTS 3,721,358  3/1973  Brock .................................. 214/394
3,999,672  12/1976  Brock .................................. 214/396

Primary Examiner—Robert G. Sheridan
Attorney, Agent, or Firm—Peter A. Taucher; John E. McRae; Nathan Edelberg

[57] ABSTRACT

A trailer for transporting freight containers, said trailer including an inverted bridge structure that can be swung away from the trailer bed to position the freight container beyond the bed side edge. Hoist mechanisms on the bridge structure are actuated to raise or lower the container as necessary.

7 Claims, 7 Drawing Figures

SELF LOAD/UNLOAD TRAILER

The invention described herein may be manufactured, used, and licensed by or for the Government for governmental purposes without payment to me of any royalty thereon.

BACKGROUND AND SUMMARY OF THE INVENTION

It is common practice to transport large multiton freight containers overland on the bed areas of large trailers. The containers are often loaded onto the trailers and later removed from the trailers by large cranes. These cranes somewhat resemble large tunnel mechanisms having hoists suspended from their upper structural areas; the tractor-trailer unit is driven into the tunnel-like crane mechanism for loading and unloading the freight containers by the overhead hoists.

In certain circumstances, for example under battle field conditions, the large loader-unloader cranes may not be available at the field sites where it is desired to load or unload the freight containers. The present invention contemplates a trailer structure having built-in hoists for loading and unloading the freight containers. The principle aim of the invention is to provide a loader-unloader mechanism which can handle very large container weights in the neighborhood of twenty tons without toppling over.

THE DRAWINGS

FIG. 2 illustrates tractor motions used to unload a container from the trailer.

Figure 1:
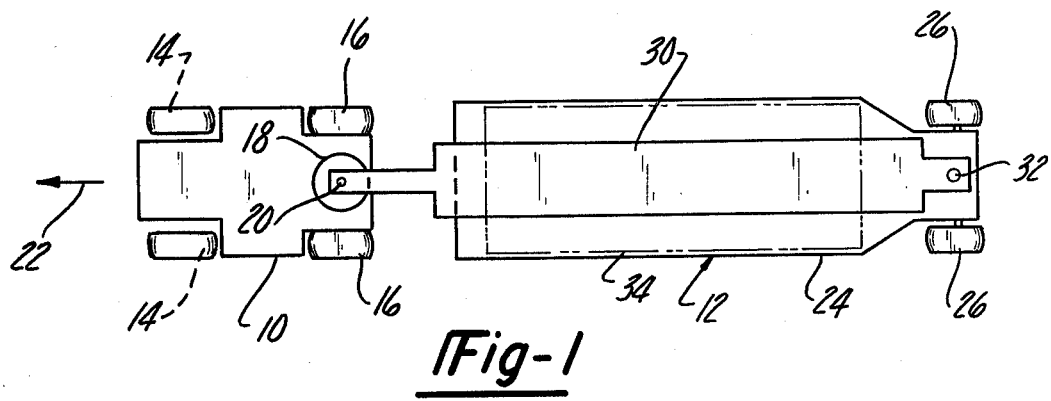
FIGS. 1 and 2 are top plan views of a tractor-trailer using this invention.

FIG. 1 illustrates a tractor-trailer unit comprising a tractor 10 and trailer 12. The tractor is a conventional engine-propelled unit having front steerable wheels 14 and rear non-steered wheels 16. The rear end area of the tractor mounts a conventional fifth wheel 18 which cooperates with a kingpin 20 carried at the forward end of trailer 12. The tractor is thus able to pull the trailer and its contents overland in the direction designated generally by numeral 22.

Trailer 12 comprises a bed means 24 having roadwheels 26 at its rear end. The trailer also comprises an inverted U-shaped bridge structure 30 having a turntable connection 32 with the rear end of bed means 24. During transit periods the freight container 34 rests on the bed means 24. To unload the freight container from the trailer the tractor 10 is maneuvered to the angled position of FIG. 2; wheels 14 are then steered in an arc around the turntable 32 axis until the tractor reaches approximately the position designated by numeral 10a in FIG. 2. This movement of the tractor causes the bridge structure 30 to swing around the turntable 32 axis, thereby locating the freight container 34 beyond the side edge of bed means 24. Hoist mechanisms within bridge structure 30 are actuated to lower the freight container to ground level. A freight container is loaded onto the trailer by an arcuate motion of the tractor from the position designated by numeral 10a to the full line position (FIG. 2).

Figure 2:
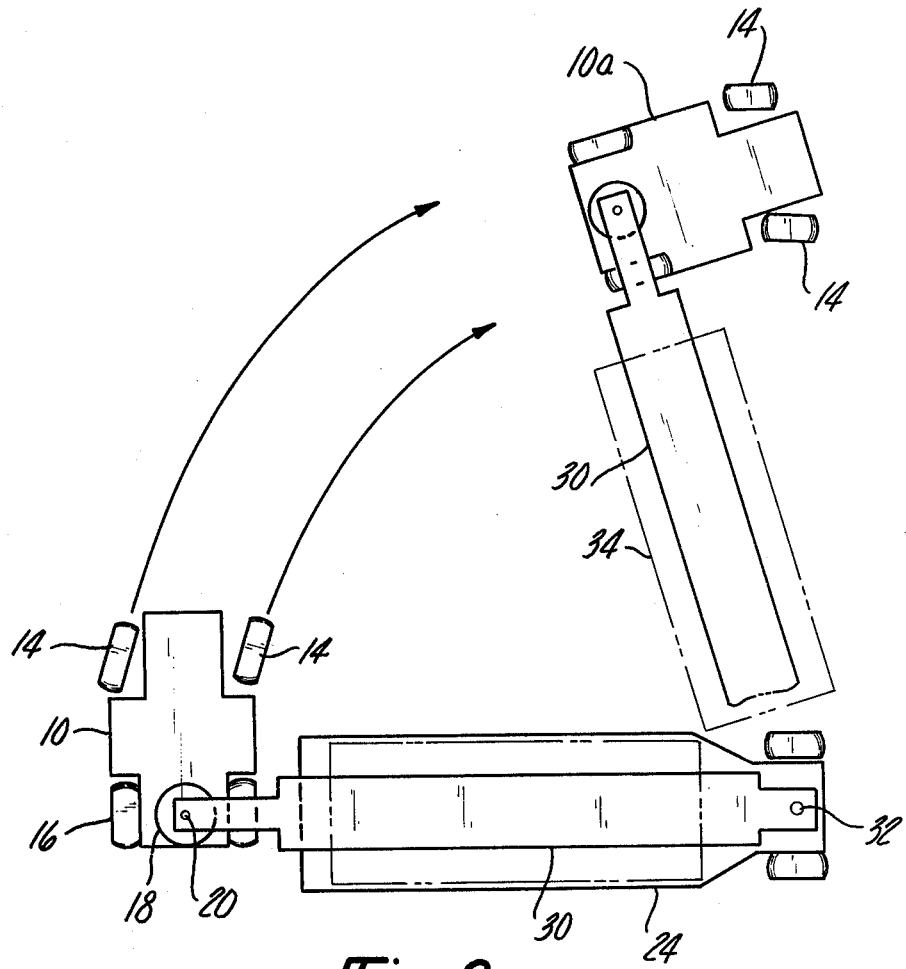
Figure 3:
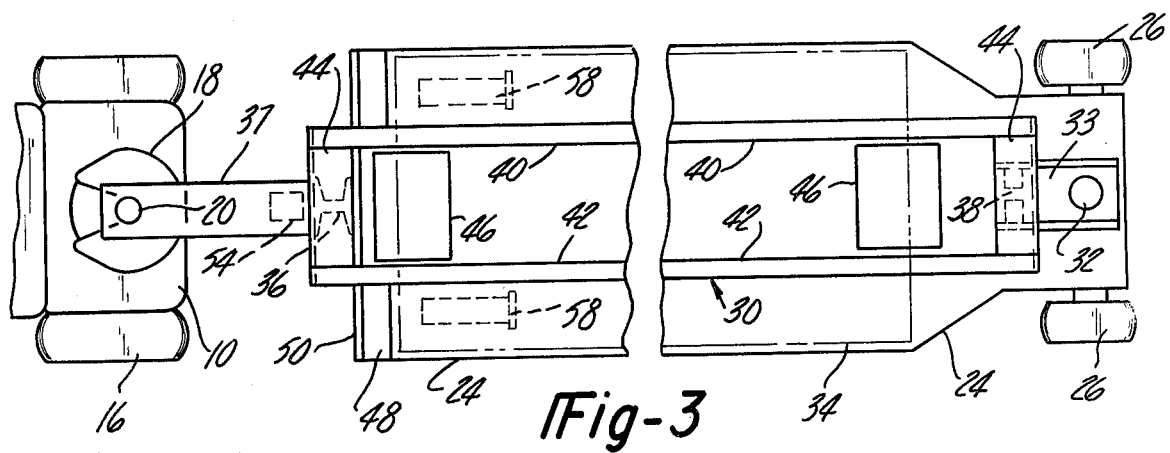
FIGS. 3 and 4 are plan and top views of the FIG. 1 tractor-trailer drawn on a larger scale to illustrate structural detail.
Figure 4:
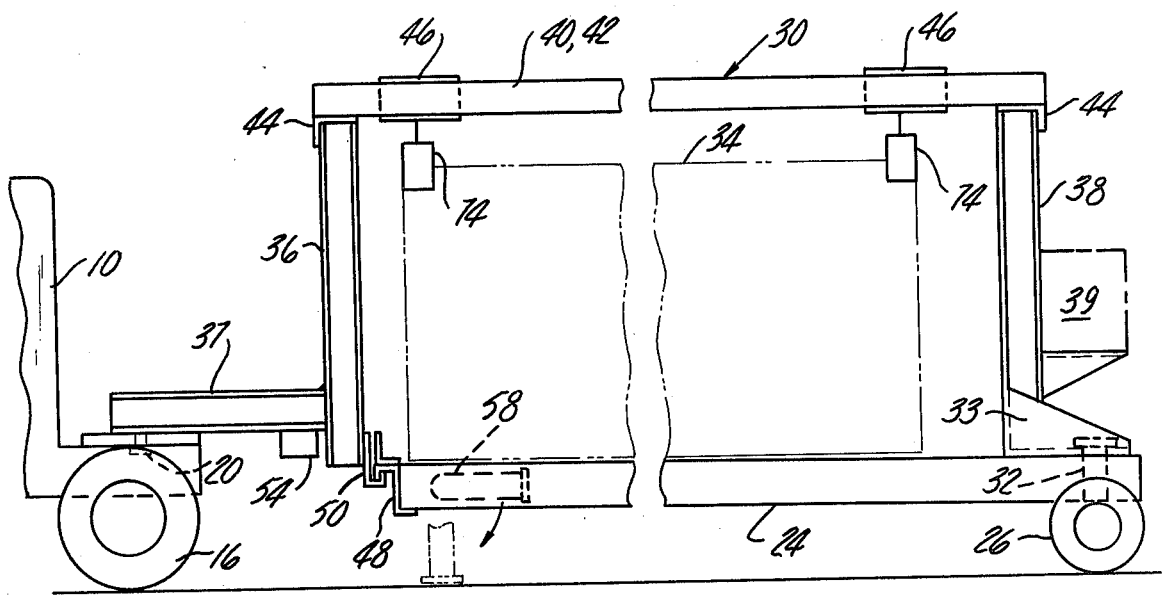
Figure 6:
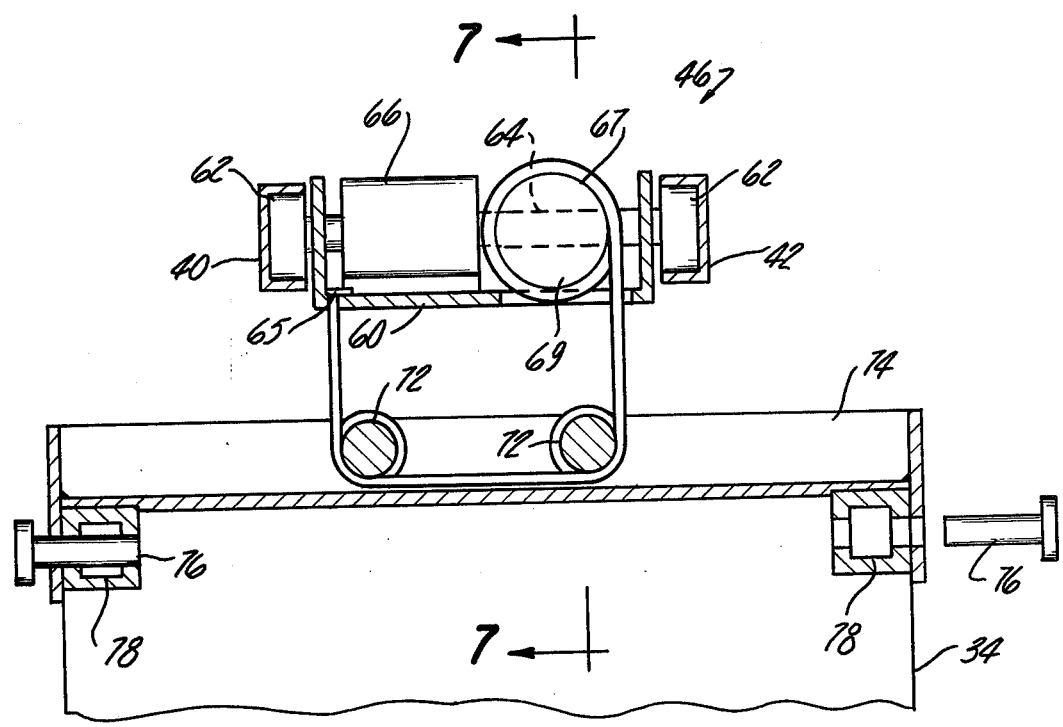
Figure 7:
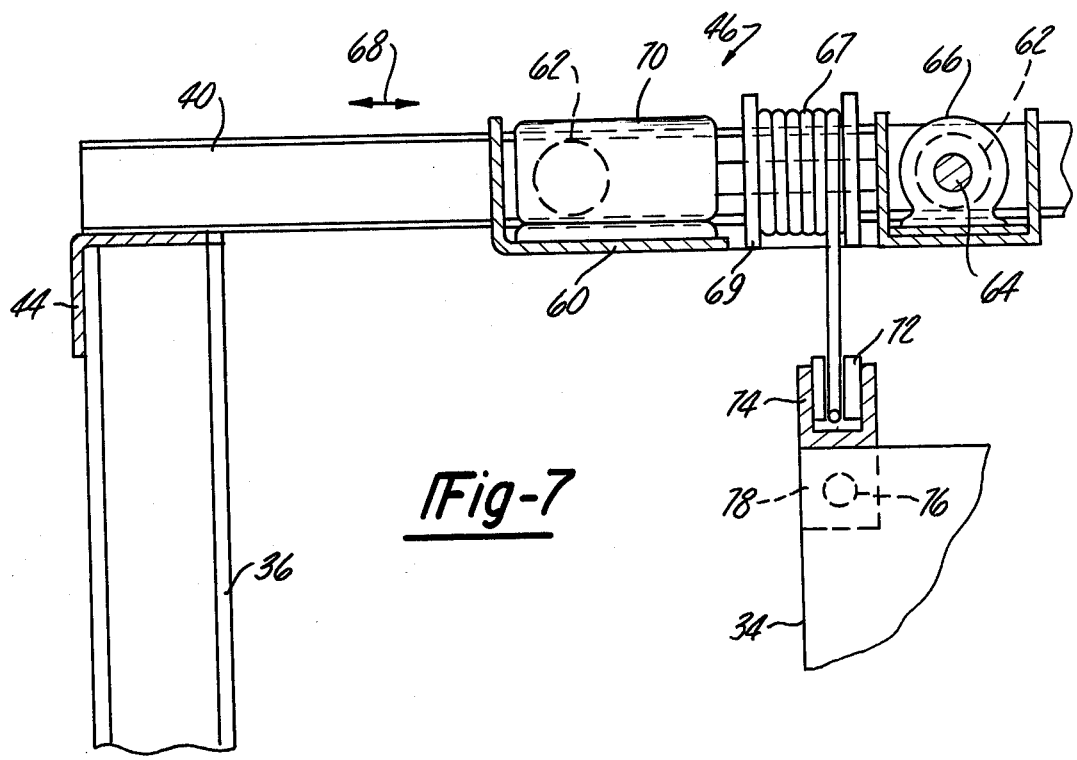

FIGS. 3 and 4 show structural detail not apparent from FIGS. 1 and 2. As seen in side elevation (FIG. 4), the bridge structure 30 includes front and rear upright I-beams 36 and 38 joined to overhead rails 40 and 42. Each beam-rail joint may be formed by a transverse angle iron 44. Rails 40 and 42 define a trackway for front and rear hoist mechanisms 46. Hoist mechanism detail is shown in FIGS. 6 and 7.

The space between upright beams 36 and 38 is of sufficient height and length to accommodate the largest freight container 34 in the cargo supply system. At present the largest conventional container measures eight feet high, eight feet wide and twenty feet long. Smaller containers have lengths of ten feet, and six feet eight inches (a one third multiple of the largest container). The smaller containers are positioned within the bridge structure by suitable preliminary movement of either hoist mechanism 46 along rails 40 and 42.

The aforementioned turntable means 32 is shown in FIGS. 3 and 4 as an upstanding shaft affixed to bed means 24 on approximately the transverse centerline defined by roadwheels 26. The shaft projects through a saddle 33 carried by beam 38, thereby mounting the bridge structure for swinging movement as depicted by FIG. 2. The area above saddle 33 may accommodate an engine-driven hydraulic pump 39 which supplies hydraulic pressure to various hydraulic motors and cylinders on the trailer. Aforementioned kingpin 20 is shown in FIG. 4 projecting downwardly from a horizontal I-beam 37 that extends forwardly from upright 36.

During transit or standby periods the bed means 24 is connected at its forward end to the bridge structure by two interengaged hanger bars 48 and 50, one rigidly affixed to the bed forward end and the other rigidly affixed to bridge element 36. Bar 50 of the bridge thus bears the weight of bar 48 and the front end portion of bed 24. Undesired upward dislocation of the bed by road disturbances may be prevented by a latch pin 52 adapted to extend from a hydraulic cylinder 54 through an opening in a keeper element 56 (mounted atop bar 48).

Figure 5:
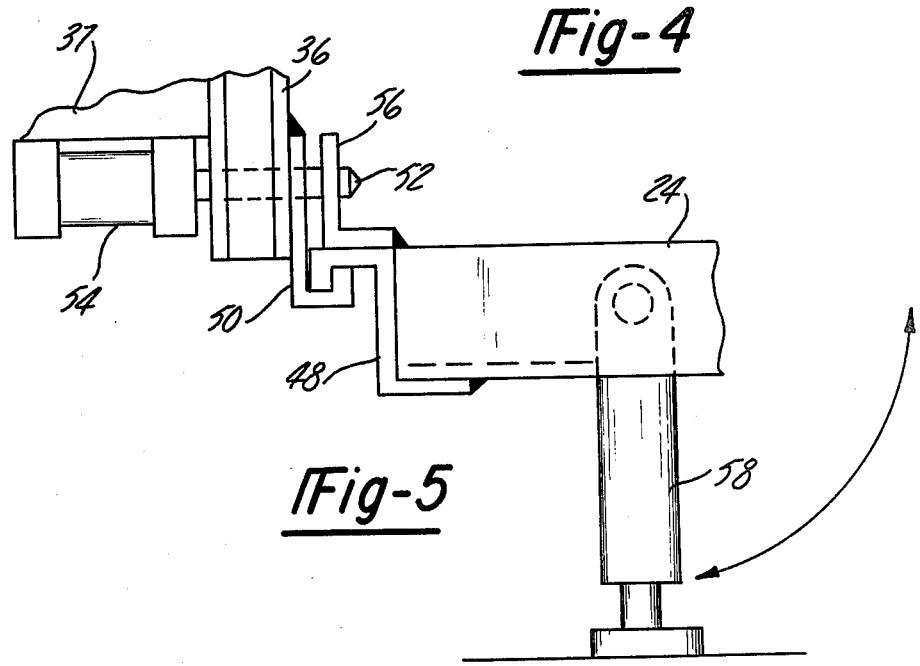
FIG. 5 is a view showing a structural arrangement used in the FIG. 4 trailer.

During container transfer periods (loading or unloading) the front end of bed 24 may be supported by landing legs 58, shown in FIGS. 3 through 5 as hydraulic cylinders mounted for downward swinging movements from retracted horizontal positions within the bed to operating vertical positions registering with the ground surface. In their operating positions the cylinders may be pressurized to slightly raise the bed and at the same time disengage bar 48 from bar 50. This bed-raising operation is of course performed with latch pin 52 in a retracted position.

Each travelling hoist mechanism 46 may be constructed in conventional fashion. As seen in FIGS. 6 and 7, the hoist includes a platform 60 equipped with four rollers 62 running within the bridge rails 40 and 42. One set of rollers is carried on the shaft 64 of a reversible hydraulic motor 66. Operation of this motor propels platform 60 along rails 42 in the directions designated by numeral 68.

The freight container load is raised and lowered by cables 61, each cable having an anchored end 65 and an operating portion 67 wound around a drum 69 that is powered by reversible hydraulic motor 70. The cable is trained around pulleys 72 carried by a spreader bar 74 that is dimensioned to fit the container width (eight feet). Pins 76 are inserted through the ends of the spreader bar into sockets 78 formed at the reinforced corners of the freight container. Any other conventional mechanism may be used to operatively connect the cables to the freight container.

During normal transit periods the hoist motors are de-energized so that the freight container(s) 34 rest on bed means 24. Each landing leg 58 is swung up to its retracted position within bed 24; also the latch pin 52 is extended into keeper 56. Bridge 30 is rigidly locked to bed 24.

When it is desired to unload a freight container from the trailer the tractor 10 is maneuvered into a position at right angles to the trailer (FIG. 2). Latch pin 52 is retracted from keeper 56, after which the landing legs 58 are lowered and then pressurized to slightly elevate bed 24. Motors 70 for the front and rear hoists are energized to lift the container clear of bed 24. Tractor 10 is then driven and steered in an arcuate path (as shown in FIG. 2) until bridge 30 is approximately normal to bed 24; landing legs 58 and roadwheels 32 maintain the bed in a stationary position. The container is lowered to ground level by reverse actuation or de-energization of hoist motors 70.

A freight container 34 may be loaded onto the trailer mechanism by a reverse sequence of operations; i.e. the tractor starts at position 10a (FIG. 2) and moves in an arc around turntable 32 toward the waiting bed 24.

Either hoist 46 may be propelled by its motor 66 along the overhead rails 40, 42 to handle different length freight containers, e.g. two ten foot containers or three smaller containers. Relocation of the hoists along the overhead rails may also be required to properly orient the spreader bars 74 on the subjacent containers, especially during a container-loading operation.

One advantage of the described mechanism is that the container load is centered beneath bridge 30 during a transfer operation (to or from bed 24). Bridge 30 is adequately supported at its opposite ends by turntable 32 and tractor 10, so that the transfer bridge mechanism is not likely to topple over; there are no cantilever forces. Another probable advantage of the mechanism is its ability to operate over relatively uneven terrain (because the tractor can adapt to terrain disturbances).

I wish it to be understood that I do not desire to be limited to the exact details of construction shown and described for obvious modifications will occur to a person skilled in the art.

I claim:

1. Improved trailer means for transporting a multi-ton freight container: said trailer means comprising an inverted U-shaped bridge and a subjacent bed means; said bed means being dimensioned to support a freight container during transit periods, and said bridge being constructed to transfer the freight container to or from the bed means and ground level during loading or unloading periods; roadwheel means carried by said bed means near its rear end; kingpin means mounted at the front end of the U-shaped bridge for engagement with a fifth wheel on a cooperating tractor; turntable connector means joining the bridge to the bed means near its rear end; and hoist means carried by the U-shaped bridge for temporarily suspending the freight container while the tractor is swinging the bridge around the turntable axis; said turntable connector means being located behind the container-accommodation zone defined by the bridge, whereby the container is located outboard from the bed means when the bridge is swung normal to the bed means.

2. The trailer means of claim 1, and further comprising landing leg means carried at the front end of the bed means for temporarily supporting said bed means while the bridge is being swung around the turntable axis.

3. The trailer means of claim 2, and further comprising hanger mechanism carried by the bridge for supporting the front end of the bed means when a freight container is positioned thereon.

4. The trailer means of claim 3, and further comprising power means for extending and retracting the landing leg means.

5. The trailer means of claim 1: the hoist means comprising two separate hoists arranged for independent movements along the bridge, whereby said hoists are enabled to raise or lower a range of differently dimensioned containers.

6. The trailer means of claim 1: said kingpin means being located a substantial distance forwardly from the bridge container-accommodation zone, whereby the towing tractor is enabled to take a position at right angles to the trailer means without striking the bridge.

7. The trailer means of claim 6: said turntable connector means being located approximately on a transverse centerline defined by the roadwheel means.

* * * * *